US012763395B2

(12) United States Patent
Hoshino

(10) Patent No.: US 12,763,395 B2
(45) Date of Patent: Oct. 13, 2026

(54) VEHICLE THAT DETERMINES WHETHER COMPONENT RELATED TO SUPPLY OF THERMAL ENERGY FROM HEATER TO POWER STORAGE DEVICE IS MALFUNCTIONING

(71) Applicant: TOYOTA JIDOSHA KABUSHIKI KAISHA, Toyota (JP)

(72) Inventor: Yu Hoshino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/169,312

(22) Filed: Apr. 3, 2025

(65) Prior Publication Data

US 2026/0066376 A1 Mar. 5, 2026

(30) Foreign Application Priority Data

Aug. 28, 2024 (JP) ................................ 2024-146890

(51) Int. Cl.

| | |
|---|---|
| ***H01M 10/625*** | (2014.01) |
| ***B60H 1/00*** | (2006.01) |
| ***B60H 1/22*** | (2006.01) |
| ***B60L 50/60*** | (2019.01) |
| ***B60L 58/27*** | (2019.01) |
| ***H01M 10/615*** | (2014.01) |
| ***H01M 10/633*** | (2014.01) |
| ***H01M 10/6568*** | (2014.01) |

(52) U.S. Cl.

CPC ...... *H01M 10/625* (2015.04); *B60H 1/00392* (2013.01); *B60H 1/2215* (2013.01); *B60L 50/60* (2019.02); *B60L 58/27* (2019.02); *H01M 10/615* (2015.04); *H01M 10/633* (2015.04); *H01M 10/6568* (2015.04); *H01M 2220/20* (2013.01)

(58) Field of Classification Search

CPC ............ H01M 10/625; H01M 10/615; H01M 10/633; H01M 10/6568; H01M 2220/20; H01M 10/663; B60H 1/00392; B60H 1/2215; B60H 2001/00307; B60H 1/00278; B60H 1/143; B60H 1/2221; B60L 50/60; B60L 58/27; B60L 2240/34; B60L 2240/545; B60L 1/02; Y02E 60/10

See application file for complete search history.

(56) References Cited

U.S. PATENT DOCUMENTS

2023/0256793 A1 8/2023 Hoshino

FOREIGN PATENT DOCUMENTS

JP 2023-118569 A 8/2023
JP 7520169 B1 * 7/2024 ............ Y02E 60/10

* cited by examiner

*Primary Examiner* — Brodie J Follman
(74) *Attorney, Agent, or Firm* — SoraIP, Inc.

(57) ABSTRACT

The vehicle is provided with a circuit portion capable of transmitting thermal energy to the air conditioner by flowing the coolant warmed by the water heater to the air conditioner side, a circuit portion capable of transmitting thermal energy to the battery device side by flowing the coolant warmed by the water heater to the battery device side, and a flow rate adjusting valve capable of adjusting the flow rate of the coolant flowing to these circuit portions, and the control unit controls the flow rate adjusting valve, based on the measurement result of the first thermometer for the coolant flowing through the circuit portion to which the thermal energy is supplied from the circuit portion via the heat exchanger from the circuit portion, the state of the circuit portion and the circuit portion is determined.

2 Claims, 3 Drawing Sheets

VEHICLE THAT DETERMINES WHETHER COMPONENT RELATED TO SUPPLY OF THERMAL ENERGY FROM HEATER TO POWER STORAGE DEVICE IS MALFUNCTIONING

CROSS-REFERENCE TO RELATED APPLICATION

This application claims priority to Japanese Patent Application No. 2024-146890 filed on Aug. 28, 2024. The disclosure of the above-identified application, including the specification, drawings, and claims, is incorporated by reference herein in its entirety.

BACKGROUND

1. Technical Field

The present disclosure relates to a vehicle.

2. Description of Related Art

Japanese Unexamined Patent Application Publication No. 2023-118569 (JP 2023-118569 A) discloses a temperature control system. In this temperature control system, distribution of heat from a heater is adjusted by controlling a flow rate of at least one of a thermal transfer medium for an air conditioner and a thermal transfer medium for a battery, in accordance with a temperature increase request for the battery, a heating request for a vehicle cabin, and battery temperature.

SUMMARY

Now, when heating is in operation, supply of the thermal energy from the heater to the battery (power storage device) via the thermal transfer medium may be restricted until the temperature of the thermal transfer medium warmed by the heater exceeds a predetermined temperature, in order to secure thermal energy to be used for heating.

When a load placed on heating is high, such as outside air temperature being low, the temperature of the thermal transfer medium that is warmed by the heater may not exceed the predetermined temperature, and the thermal energy from the heater may not be supplied to the battery.

In such a case, it is difficult to determine whether the reason why the temperature of the battery is not rising is that the supply of the thermal energy by the heater is concentrated on the heating side, or that a component related to the supply of the thermal energy from the heater to the battery is malfunctioning.

Taking the above circumstances into consideration, it is an object of the present disclosure to provide a vehicle that enables easier determination regarding whether a component related to supply of thermal energy from a heater to a power storage device is malfunctioning.

A vehicle according to a first aspect includes

- a motor that is driven by electric power supplied from a power storage device and that also functions as a driving source when the vehicle is traveling,
- a heater that is configured to supply thermal energy to an air conditioner that supplies warm air into a vehicle cabin, and to the power storage device, via a thermal transfer medium,
- a first circuit portion that is configured to deliver the thermal energy to the air conditioner by causing the thermal transfer medium that is warmed by the heater to flow to a side of the air conditioner,
- a second circuit portion that is configured to deliver the thermal energy to the power storage device by causing the thermal transfer medium that is warmed by the heater to flow to a side of the power storage device,
- a flow rate adjustment unit that is configured to cause the thermal transfer medium flowing out of the heater to flow to the first circuit portion and the second circuit portion, and that is configured to adjust a first flow rate of the thermal transfer medium flowing through the first circuit portion, and a second flow rate of the thermal transfer medium flowing through the second circuit portion,
- a first thermometer that is configured to measure a first temperature of the thermal transfer medium immediately before supplying the thermal energy to the power storage device on the second circuit portion, and
- a control unit that controls the flow rate adjustment unit such that the second flow rate is restricted to a first predetermined flow rate that is smaller than the first flow rate when the air conditioner is started in a state of a predetermined air temperature or lower, determines the second circuit portion to be normal when the first temperature reaches a first predetermined temperature or higher within a predetermined amount of time from starting the air conditioner and also controls the flow rate adjustment unit to stop inflow of the thermal transfer medium to a side of the second circuit portion, and determines the second circuit portion to be abnormal when the first temperature does not reach the first predetermined temperature within the predetermined amount of time from the starting and also controls the flow rate adjustment unit to stop the inflow of the thermal transfer medium to the side of the second circuit portion.

The vehicle according to the first aspect is equipped with the motor, and the motor is driven by the electric power that is supplied from the power storage device and functions as the driving source when the vehicle is traveling. Also, the power storage device is supplied with thermal energy from the heater via the thermal transfer medium, and operation of the power storage device, and hence the motor, can be stabilized when the outside air temperature is low, or the like.

The heater can also supply thermal energy to the air conditioner in the same way, and warm air can be supplied into the vehicle cabin by the air conditioner.

Now, when warm air is being supplied by the air conditioner, the supply of the thermal energy from the heater to the power storage device via the thermal transfer medium may be restricted until the temperature of the thermal transfer medium that is warmed by the heater exceeds a predetermined temperature, in order to secure thermal energy for use by the air conditioner.

When a load placed on the air conditioner is high, the temperature of the thermal transfer medium that is warmed by the heater may not exceed the predetermined temperature, and the thermal energy from the heater may not be supplied to the power storage device.

In such a case, it is difficult to determine which of the following is the reason why the temperature of the power storage device does not rise. That is to say, it is difficult to determine whether the supply of the thermal energy by the heater is concentrated on the air conditioner side, or whether a component related to the supply of the thermal energy from the heater to the power storage device is malfunctioning.

Here, the present aspect includes the first circuit portion that is capable of delivering the thermal energy to the air conditioner by causing the thermal transfer medium that is warmed by the heater to flow to the air conditioner side, the second circuit portion that is capable of delivering the thermal energy to the power storage device by causing the thermal transfer medium that is warmed by the heater to flow to the power storage device side, and the flow rate adjustment unit that is capable of adjusting the flow rate of the thermal transfer medium flowing to these circuit portions. The control unit is arranged to determine a state of the second circuit portion, based on measurement results of the first thermometer with respect to the thermal transfer medium flowing through the second circuit portion, while controlling the flow rate adjustment unit.

Specifically, the flow rate adjustment unit is capable of causing the thermal transfer medium flowing out of the heater to flow to the first circuit portion and the second circuit portion, and is arranged to adjust the first flow rate of the thermal transfer medium flowing through the first circuit portion, and the second flow rate of the thermal transfer medium flowing through the second circuit portion.

On the other hand, the first thermometer is arranged to measure the first temperature of the thermal transfer medium immediately before supplying the thermal energy to the power storage device on the second circuit portion.

The control unit then controls the flow rate adjustment unit such that the second flow rate is restricted to the first predetermined flow rate that is smaller than the first flow rate, when the air conditioner is started in a state of a predetermined air temperature or lower. Accordingly, in the present aspect the thermal energy from the heater is supplied not only to the air conditioner side but also to the power storage device, even in the state of the predetermined temperature or lower.

That is to say, in the present aspect, when there is no abnormality in the second circuit portion that delivers the thermal energy from the heater to the power storage device, the first temperature that is measured by the first thermometer will rise, and when there is an abnormality in the second circuit portion, there will be no change in the first temperature measured by the first thermometer.

The control unit then determines that the second circuit portion is normal when the first temperature reaches the first predetermined temperature or higher within the predetermined time from the starting of the air conditioner, and stops the inflow of the thermal transfer medium to the second circuit portion side by controlling the flow rate adjustment unit.

Also, the control unit determines that the second circuit portion is abnormal when the first temperature does not rise to the first predetermined temperature within the predetermined time from the starting of the air conditioner, and stops the inflow of the thermal transfer medium to the second circuit portion side by controlling the flow rate adjustment unit.

In this way, according to the present aspect, whether there is an abnormality in the second circuit portion can be determined within the predetermined time from the starting of the air conditioner, and the thermal energy from the heater can be concentrated on the air conditioner after the determination is completed.

The vehicle according to the above aspect may further include a second thermometer that is configured to measure a second temperature of the thermal transfer medium immediately after flowing out of the heater.

The control unit may control the flow rate adjustment unit such that the second flow rate becomes a second predetermined flow rate that is greater than the first predetermined flow rate, when the second temperature is a second predetermined temperature that is higher than the first predetermined temperature, or higher.

According to the vehicle described above, the second temperature of the thermal transfer medium immediately after flowing out of the heater can be measured by the second thermometer.

The control unit of the above-described configuration then controls the flow rate adjustment unit such that the second flow rate of the thermal transfer medium, flowing to the second circuit portion to deliver the thermal energy from the heater to the power storage device, is the second predetermined flow rate that is greater than the first predetermined flow rate, when the second temperature is the second predetermined temperature that is higher than the first predetermined temperature, or higher.

Accordingly, in the above configuration, in conjunction with the second temperature of the thermal transfer medium immediately after flowing out of the heater rising, the second flow rate of the thermal transfer medium flowing into the second circuit portion is increased, and temperature rise of the power storage device can be promoted.

As described above, the vehicle according to the present disclosure has an excellent advantage in that whether a component related to the supply of the thermal energy from the heater to the power storage device is malfunctioning can be easily determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
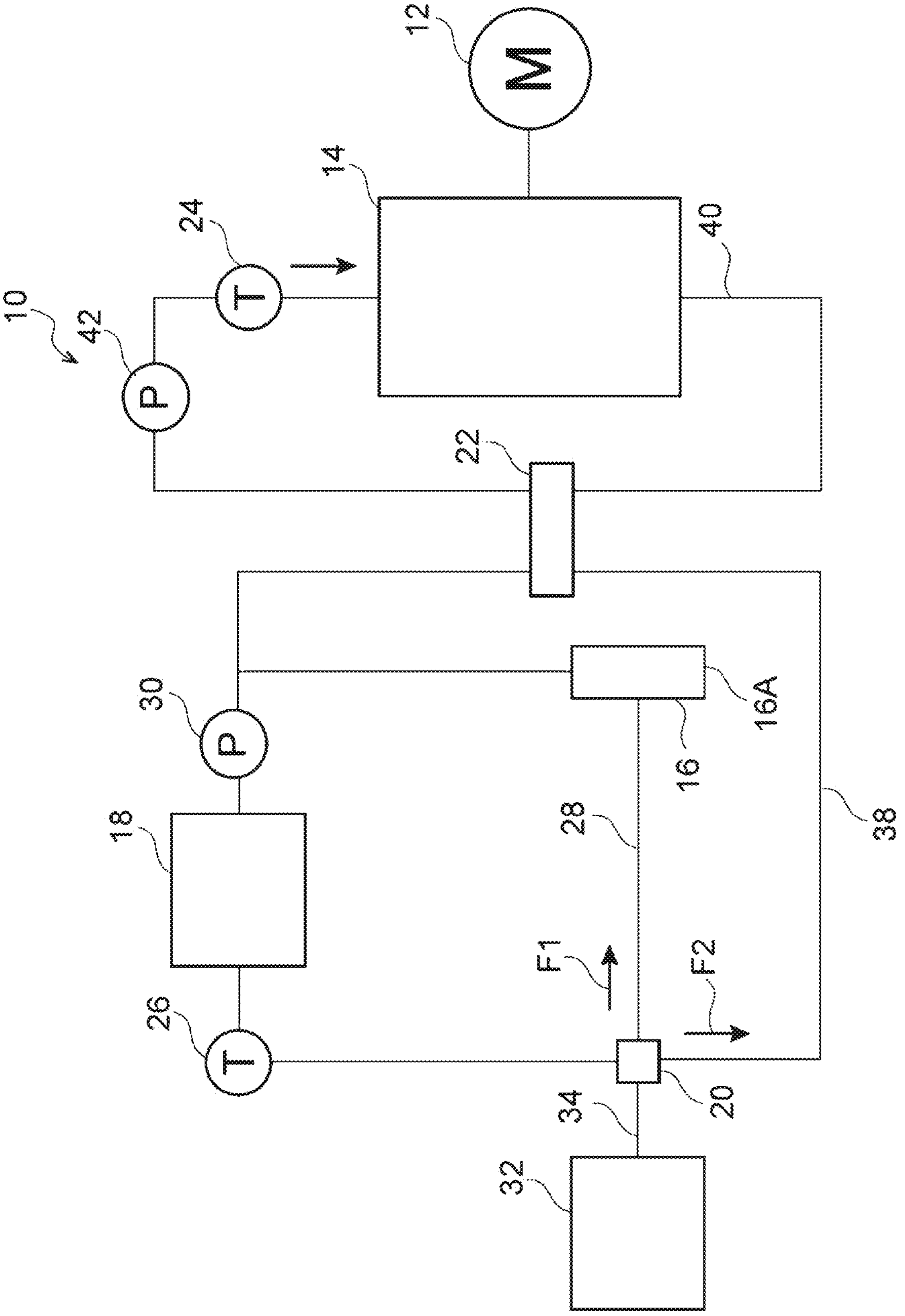
FIG. 1 is a block diagram illustrating a hardware configuration of a vehicle according to the present embodiment.

Hereinafter, an example of an embodiment of a vehicle according to the present disclosure will be described with reference to FIGS. 1 to 3. As shown in FIG. 1, the vehicle 10 according to the present embodiment includes a motor 12, a battery device 14 as a power storage device, and an air conditioner 16. Further, the vehicle 10 includes a water heater 18 serving as a heater, a flow rate regulating valve 20 serving as a flow rate adjustment unit, a heat exchanger 22, a first thermometer 24, and a second thermometer 26.

The motor 12 functions as a driving source when the vehicle 10 is traveling, and also functions as a generator, so that a regenerative braking force can be generated.

The battery device 14 is capable of supplying electric power to the motor 12 and charging the motor 12 by regenerative electric power. Further, the battery device 14 is capable of supplying electric power to the water heater 18 as will be described later.

The air conditioner 16 includes a heater core 16A, and is capable of supplying warm air to the inside of the vehicle 10 (vehicle cabin) by warming the air flowing from a blower (not shown) with the thermal energy supplied from the water heater 18 as described later.

The water heater 18 is capable of warming a coolant (not shown) as a thermal transfer medium flowing through the circuit portion 28 with electric power supplied from the battery device 14. The circuit portion 28 functions as a first circuit portion that connects the heater core 16A, the water heater 18, the flow rate regulating valve 20, and the heat exchanger 22. The coolant flowing through the circuit portion 28 is pumped by the pump 30 and flows to the flow rate regulating valve 20 side via the water heater 18.

Specifically, the coolant warmed by the water heater 18 branches into a flow rate regulating valve 20 flowing toward the heater core 16A and a flow rate flowing toward the heat exchanger 22. Thermal energy is supplied from the water heater 18 to the heater core 16A and the heat exchanger 22 via a coolant.

The flow rate regulating valve 20 is also connected with a circuit portion 34 through which coolant for cooling the engine 32 flows, and the coolant warmed by the water heater 18 and the coolant warmed by the engine 32 flow into the flow rate regulating valve 20.

Further, the flow rate regulating valve 20 is controlled by the "control unit 36" as described later, so that the "first flow rate F1" of the coolant flowing to the heater-core 16A side and the "second flow rate F2" of the coolant flowing to the heat-exchanger 22 side can be adjusted.

The heat exchanger 22 exchanges thermal energy between the coolant flowing through the circuit portion 38 and the coolant flowing through the circuit portion 40. The circuit portion 38 connects the flow rate regulating valve 20 to the downstream side of the heater-core 16A in the circuit portion 28 and the upstream side of the pump 30. The circuit portion 40 is connected to a heating pipe (not shown) provided in the battery device 14.

That is, the thermal energy from the water heater 18, the heat exchanger 22, is adapted to be supplied to the battery device 14 side via the circuit portion 38 and the circuit portion 40, the circuit portion 38 and the circuit portion 40 functions as a second circuit portion. The coolant flowing through the circuit portion 40 is pumped by the pump 42, and the output of the pump 42 is controllable by the control unit 36.

The first thermometer 24 is disposed with respect to the circuit portion 40, and is capable of measuring the "first temperature T1" of the coolant immediately before the thermal energy is supplied to the battery device 14 in the circuit portion 40. The measurement data of the first thermometer 24 is transmitted to the control unit 36.

The second thermometer 26 is disposed with respect to the circuit portion 28, and is capable of measuring the "second temperature T2" of the coolant immediately after flowing out of the water heater 18. The measurement data of the second thermometer 26 is transmitted to the control unit 36.

Here, the present embodiment is characterized in that the control unit 36 can perform failure diagnosis of the circuit portion 40 and the like at the time of cold start of the motor 12 and the like. Hereinafter, the configuration of the control unit 36 will be described in detail.

Figure 2:
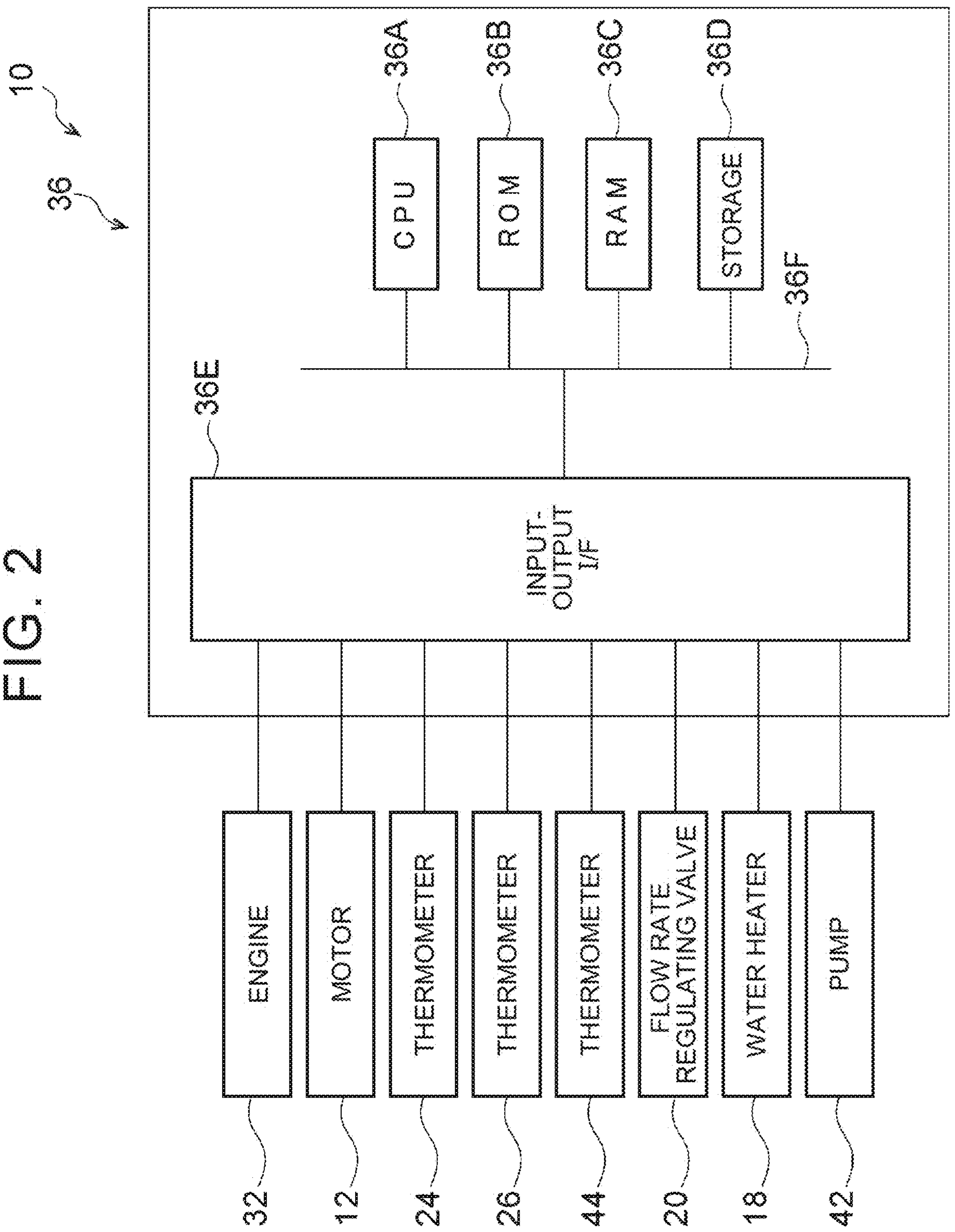
FIG. 2 is a block-diagram illustrating a relation between a control unit mounted on a vehicle according to the present embodiment and a peripheral device thereof.
Figure 3:
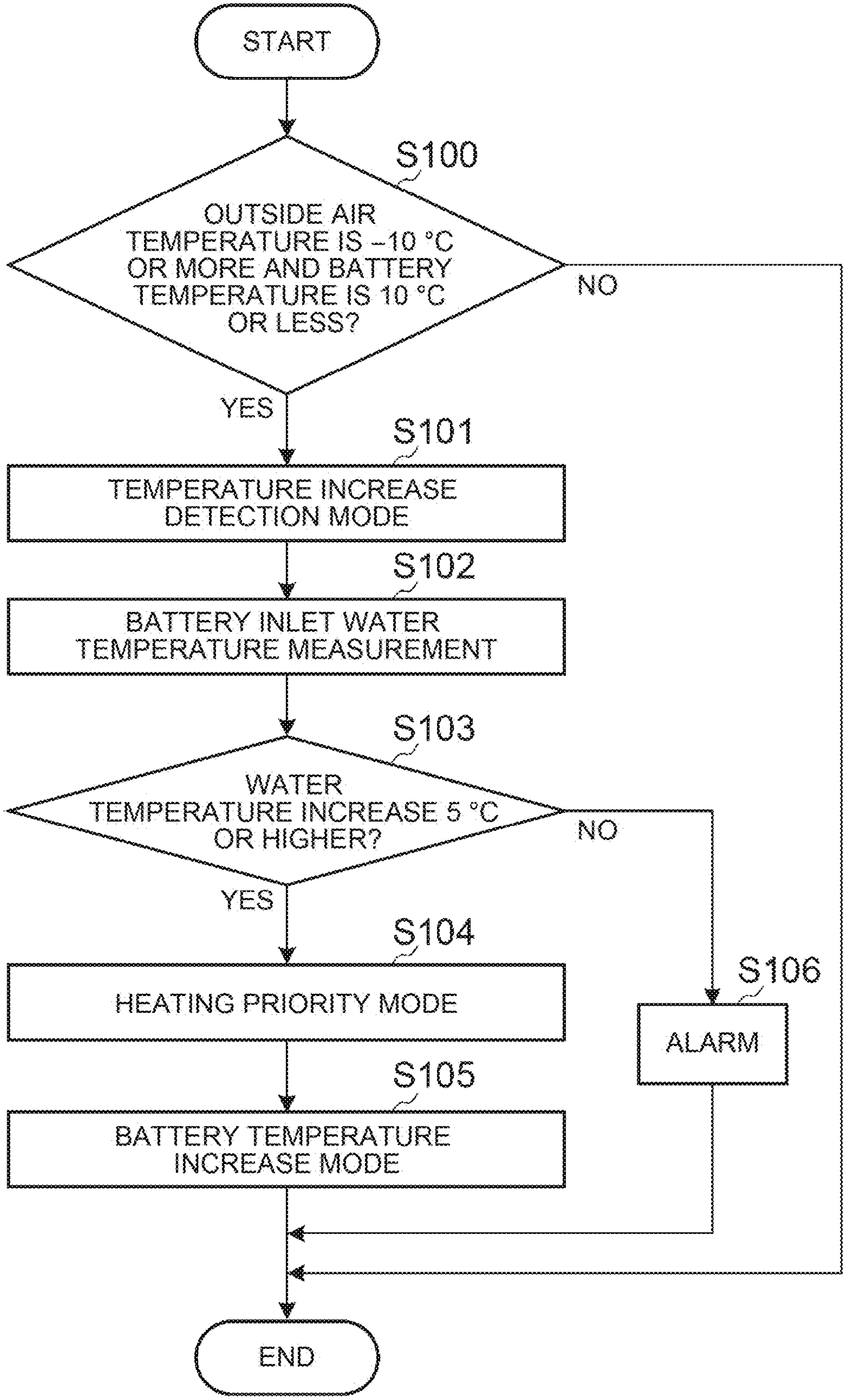
FIG. 3 is a flowchart illustrating an example of processing performed by a control unit mounted on a vehicle according to the present embodiment.

As illustrated in FIG. 2, the control unit 36 includes a CPU (Central Processing Unit) 36A, ROM (Read Only Memory) 36B, RAM (Random Access Memory) 36C, a storage 36D, and an input/output I/F (Interface) 36E. CPU 36A, ROM 36B, RAM 36C, the storage 36D, and the input/output I/F 36E are communicably connected to each other via a buss 36F.

CPU 36A is a central processing unit that can control various devices by executing various programs. Specifically, CPU 36A can read a program from ROM 36B and execute the program using RAM 36C as a working area. Then, the executable program stored in ROM 36B is read and executed by CPU 36A, so that the control unit 36 can perform various functions as described later.

More specifically, ROM 36B stores various programs and various data related to the control of the flow rate regulating valve 20 and the pump 42. On the other hand, RAM 36C can temporarily store programs/data as a working area.

The storage 36D is configured to include HDD (Hard Disk Drive) or SSD (Solid State Drive), and is capable of storing various programs including an operating system and various data.

The input/output I/F 36E serves as an interface for the control unit 36 to communicate with various devices mounted on the vehicles 10. The control unit 36 is communicably connected to various devices described later via an input/output I/F 36E.

Specifically, the device connected to the control unit 36 includes a motor 12, a water heater 18, a flow rate regulating valve 20, a first thermometer 24, a second thermometer 26, an engine 32, a pump 42, and an outside air thermometer 44 capable of measuring the outside air temperature of the vehicle 10.

When an operation input of a power switch (not shown) by an occupant is input, the control unit 36 activates the motor 12, the battery device 14, and the engine 32. At this time, measurement data of the temperature of the battery device 14 by a battery thermometer (not shown) provided in the battery device 14 is transmitted to the control unit 36.

Further, in the present embodiment, when an operation input of an air-conditioning switch (not shown) by an occupant is input, the air conditioner 16 is activated, and when it is assumed that the battery device 14 is in a cryogenic state, the control unit 36 shifts to the temperature increase detection mode. When the battery device 14 is in a cryogenic state, for example, the outside air temperature measured by the outside air thermometer 44 is −10° C. or higher, and the temperature of the battery device 14 measured by the battery thermometer is 10° C. or lower (or the outside air temperature measured by the outside air thermometer 44 is 10° C. or lower). Note that the outside air temperature and the set temperature of the battery device 14 when the control unit 36 shifts to the temperature increase detection mode can be changed as appropriate.

Specifically, in the temperature increase detection mode, the control unit 36 controls the flow rate regulating valve 20 as follows. First, the second flow rate F2 of the coolant flowing from the flow rate regulating valve 20 toward the circuit portion 38 side is controlled so as to be restricted to a "first predetermined flow rate F3" smaller than the first flow rate F1 of the coolant flowing from the flow rate regulating valve 20 toward the circuit portion 28 side. Specifically, the control unit 36, when the coolant flowing from the flow rate regulating valve 20 to the circuit portion 28 side is restricted to the first predetermined flow rate F3, the valve opening degree of the circuit portion 38 side of the flow rate regulating valve 20 is set to 15 degrees from 10, and the duty cycle of the pump 42 is set to 45% from 35.

At this time, the control unit 36 acquires the measured data of the first temperature T1 of the coolant flowing through the circuit portion 40 by the first thermometer 24 as the initial-value T0 of the first temperature T1.

Next, the control unit 36 compares the measured data of the first temperature T1 with the initial value T0 after a predetermined period M (for example, 10 minutes) has elapsed from the start-up of the device. Then, when the first temperature T1 has increased by 5° C. or more from the initial value T0, the control unit 36 determines that the circuit portion 38 and the circuit portion 40 are normal, and shifts to the heating-priority mode. When the first temperature T1 is increased by 5° C. or more from the initial value T0, that is, when the first temperature T1 is equal to or higher than the "first predetermined temperature T3" which is 5° C. higher than the initial value T0. At this time, the control unit 36 controls the flow rate regulating valve 20 to stop the flow of the coolant from the flow rate regulating valve 20 toward the circuit portion 38.

Further, the control unit 36, in the heating priority mode, when the second temperature T2 measured by the second thermometer 26 is higher than the first predetermined temperature T3 "second predetermined temperature T4 (60° C. as an example)" or more, the battery temperature increase mode It is adapted to shift to. Specifically, in the battery temperature raising mode, the control unit 36 sets the valve opening degree of the flow rate regulating valve 20 on the side of the circuit portion 38 to the maximum and sets the duty ratio of the pump 42 to the maximum. In this way, the control unit 36 controls the flow rate regulating valve 20 so that the second flow rate F2 becomes a "second predetermined flow rate F4" larger than the first predetermined flow rate F3.

On the other hand, when the first temperature T1 does not increase by 5° C. or more from the initial value T0, the control unit 36 determines that at least one of the circuit portion 38 and the circuit portion 40 is abnormal. The control unit 36 transmits an alarm to a monitor, a terminal, or the like (not shown). This is the case where the first temperature T1 has not increased by 5° C. or more from the initial value T0, that is, the case where the first temperature T1 has not reached the first predetermined temperature T3. At this time, the control unit 36 controls the flow rate regulating valve 20 to stop the flow of the coolant from the flow rate regulating valve 20 toward the circuit portion 38.

Actions and Effects of Embodiment

Next, actions and effects of the embodiment will be described.

In the present embodiment, as shown in FIG. 1, a motor 12 is provided, and the motor 12 is driven by electric power supplied from the battery device 14 and functions as a driving source when the vehicle 10 is traveling. In addition, thermal energy is supplied from the water heater 18 to the battery device 14 through the coolant, and it is possible to stabilize the operation of the battery device 14 and thus the motor 12 in a case where the outside air temperature is low.

The water heater 18 is also capable of supplying thermal energy to the air conditioner 16, and the warm air can be supplied to the inside of the vehicle 10 by the air conditioner 16.

When the warm air is supplied by the air conditioner 16, the supply of the thermal energy may be restricted as follows in order to secure the thermal energy used in the air conditioner 16. That is, the supply of thermal energy from the water heater 18 to the battery device 14 through the coolant may be restricted until the temperature of the coolant warmed by the water heater 18 exceeds a predetermined temperature.

When the load of the air conditioner 16 is high, the temperature of the coolant warmed by the water heater 18 may not exceed a predetermined temperature, and the thermal energy from the water heater 18 may not be supplied to the battery device 14.

In such a case, it is difficult to determine whether the reason why the temperature of the battery device 14 does not increase is that the supply of the thermal energy by the water heater 18 is concentrated on the air conditioner 16 side, or that the component related to the supply of the thermal energy from the water heater 18 to the battery device 14 fails.

Here, in the present embodiment, the circuit portion 28, the circuit portion 38, and the flow rate regulating valve 20 capable of adjusting the flow rate of the coolant flowing through these circuit portions are provided. The circuit portion 28 is a circuit portion capable of transferring thermal energy to the air conditioner 16 by flowing the coolant warmed by the water heater 18 to the air conditioner 16 side. The circuit portion 38 is a circuit portion capable of transferring thermal energy to the battery device 14 by flowing the coolant warmed by the water heater 18 to the battery device 14 side.

Then, the control unit 36 determines the state of the circuit portion 38 and the circuit portion 40 based on the measurement result of the first thermometer 24 with respect to the coolant flowing through the circuit portion 40 while controlling the flow rate regulating valve 20. thermal energy is supplied from the circuit portion 38 to the circuit portion 40 via the heat exchanger 22.

Hereinafter, with reference to FIG. 3, a control process for diagnosing failure of the circuit portion 38 and the circuit portion 40 by programming executed in CPU 36A will be described. This control process is started when CPU 36A receives an operation-input of the air-conditioning switch by the occupant.

When this control flow is started, in S100, CPU 36A determines whether the battery device 14 is in a cryogenic condition based on the measured data of the outside air thermometer 44 and the measured data of the battery thermometer. That is, it is determined whether or not the outside air temperature is −10° C. or higher and the temperature of the battery device 14 is 10° C. or lower (or the outside air temperature measured by the outside air thermometer 44 is 10° C. or lower). Then, when CPU 36A determines that the battery device 14 is in the cryogenic state (S100: YES), it proceeds to S101, and when it determines that the battery device 14 is not in the cryogenic state (S100: No), it terminates the above-described control flow.

In S101, CPU 36A shifts to the temperature increase detecting mode. Specifically, CPU 36A controls the flow rate regulating valve 20 so that the second flow rate F2 of the coolant is restricted to the first predetermined flow rate F3 smaller than the first flow rate F1 of the coolant, and proceeds to S102. The second flow rate F2 is a flow rate of the coolant flowing from the flow rate regulating valve 20 toward the circuit portion 38. The first flow rate F1 of the coolant is a flow rate of the coolant flowing from the flow rate regulating valve 20 toward the circuit portion 28.

In S102, CPU 36A acquires the measured data of the first temperature T1 of the coolant immediately before the thermal energy is supplied to the battery device 14 in the circuit portion 40 by the first thermometer 24 as the initial value T0 of the first temperature T1, and proceeds to S103.

In S103, CPU 36A compares the measured data of the first temperature T1 with the initial value T0 for a predetermined period M after the operation-input of the air-conditioning switch, and determines whether or not the first temperature T1 has increased by 5° C. or more from the initial value T0. Then, when the first temperature T1 has increased by 5° C. or more from the initial-value T0 (S103: YES), CPU 36A determines that the circuit portion 38 and the circuit portion 40 are normal, and proceeds to S104.

On the other hand, when the first temperature T1 does not increase by 5° C. or more from the initial value T0 (S103: NO), CPU 36A determines that at least one of the circuit portion 38 and the circuit portion 40 is abnormal. Then, CPU 36A controls the flow rate regulating valve 20 to stop the flow of the coolant from the flow rate regulating valve 20 toward the circuit portion 38, and proceeds to S106.

In S104, CPU 36A shifts to the heating priority mode, controls the flow rate regulating valve 20 to stop the flow of the coolant from the flow rate regulating valve 20 toward the circuit portion 38 side, and concentrates the thermal energy supplied by the water heater 18 on the heater core 16A side. Then, CPU 36A proceeds to S105 when the second temperature T2 measured by the second thermometer 26 is 60° C. or higher.

In S105, CPU 36A shifts to the battery temperature increase mode, and sets the valve opening degree of the flow rate regulating valve 20 on the side of the circuit portion 38 to the highest so that the second flow rate F2 becomes the second predetermined flow rate F4 larger than the first predetermined flow rate F3. Then, CPU 36A sets the duty cycle of the pump 42 to the maximum, and terminates the control process.

In S106, CPU 36A transmits an alarm to a monitor, a terminal, or the like, and controls the flow rate regulating valve 20 to stop the flow of coolant from the flow rate regulating valve 20 toward the circuit portion 38, thereby terminating the control flow.

As described above, in the present embodiment, it is possible to more easily determine whether or not a component related to the supply of the thermal energy from the water heater 18 to the battery device 14 has failed.

Further, in the present embodiment, as the second temperature T2 of the coolant immediately after flowing out of the water heater 18 increases, the second flow rate F2 of the coolant flowing into the circuit portion 38 and the circuit portion 40 can be increased, and the temperature increase of the battery device 14 can be accelerated.

What is claimed is:

1. A vehicle, comprising:

a motor that is driven by electric power supplied from a power storage device and that also functions as a driving source when the vehicle is traveling;

a heater that is configured to supply thermal energy to an air conditioner that supplies warm air into a vehicle cabin, and to the power storage device, via a thermal transfer medium;

a first circuit portion that is configured to deliver the thermal energy to the air conditioner by causing the thermal transfer medium that is warmed by the heater to flow to a side of the air conditioner;

a second circuit portion that is configured to deliver the thermal energy to the power storage device by causing the thermal transfer medium that is warmed by the heater to flow to a side of the power storage device;

a flow rate adjustment unit that is configured to cause the thermal transfer medium flowing out of the heater to flow to the first circuit portion and the second circuit portion, and that is configured to adjust a first flow rate of the thermal transfer medium flowing through the first circuit portion, and a second flow rate of the thermal transfer medium flowing through the second circuit portion;

a first thermometer that is configured to measure a first temperature of the thermal transfer medium immediately before supplying the thermal energy to the power storage device on the second circuit portion; and a control unit that controls the flow rate adjustment unit such that the second flow rate is restricted to a first predetermined flow rate that is smaller than the first flow rate when the air conditioner is started in a state of a predetermined air temperature or lower, determines the second circuit portion to be normal when the first temperature reaches a first predetermined temperature or higher within a predetermined amount of time from starting the air conditioner and also controls the flow rate adjustment unit to stop inflow of the thermal transfer medium to a side of the second circuit portion, and determines the second circuit portion to be abnormal when the first temperature does not reach the first predetermined temperature within the predetermined amount of time from the starting and also controls the flow rate adjustment unit to stop the inflow of the thermal transfer medium to the side of the second circuit portion.

2. The vehicle according to claim 1, further comprising:

a second thermometer that is configured to measure a second temperature of the thermal transfer medium immediately after flowing out of the heater, wherein the control unit controls the flow rate adjustment unit such that the second flow rate becomes a second predetermined flow rate that is greater than the first predetermined flow rate, when the second temperature is a second predetermined temperature that is higher than the first predetermined temperature, or higher.

* * * * *